May 13, 1969  M. H. GROVE  3,443,788
GATE VALVE WITH LOCKING PINS
Filed Dec. 4, 1967

INVENTOR.
MARVIN H. GROVE
BY Flehr, Hohbach, Test,
Albritton & Herbert
ATTORNEYS

United States Patent Office 3,443,788
Patented May 13, 1969

1

3,443,788
GATE VALVE WITH LOCKING PINS
Marvin H. Grove, Houston, Tex., assignor to M & J Valve Company, Houston, Tex., a corporation of Delaware
Continuation-in-part of application Ser. No. 635,834, May 3, 1967. This application Dec. 4, 1967, Ser. No. 687,781
Int. Cl. F16k 35/02, 3/00
U.S. Cl. 251—112     3 Claims

ABSTRACT OF THE DISCLOSURE

A valve of the gate type in which normal movement of the gate by conventional valve operating means serves to position the gate in either full open or closed positions. Retractable locking means in the form of one or more locking pins are mounted in the side walls whereby the gate can be locked against such normal movement.

Cross-reference to related application

This application is a continuation-in-part of my copending application Ser. No. 635,834 filed May 3, 1967 and entitled "Valve Equipment With Hydraulic Operator."

Background of the invention

Conventional gate valves consist of a body having end walls provided with aligned flow passages and with an inner gate connected by a stem or rod to external valve operating means for moving the gate between open and closed positions. Gate valves of the fabricated type to which the present invention is particularly applicable employ box-like bodies comprising rectangular flat end walls connected along their side edges by side walls. Closure means are provided at the upper and lower ends of the body, such as a flange and bonnet plate at the upper end, and a closure plate welded to the lower end. The gate used in fabricated gate valves is generally flat with parallel valve working surfaces. Suitable sealing means are provided between the gate and the body to ensure a tight shut-off when the gate is in closed position. The valve operating means connected to the operating rod or stem may be any one of several conventional types, such as a nut and hand wheel for manual operation, an electric motor geared to a nut threaded upon the stem, a gas pressure operated or hydraulic piston-cylinder assembly, and the like. A gate valve of this type is disclosed for example in Grove Patent 3,260,503.

Conventional hand and power valve operators are susceptible to accidental valve operation. This is particularly true when power operators are employed with control from a remote station. Also during the field repair of gate valves, having reference particularly to gate valves of the fabricated type, it is common for the valve to remain connected in the line while the valve operator and the bonnet assembly are removed. Accidental movement of the gate under such conditions may be dangerous to surrounding personnel.

Summary of the invention and objects

This invention relates generally to the construction of gate valves, and particularly to gate valves of the fabricated type made in the larger sizes.

It is an object of the invention to provide a valve of the above character with provision for locking the gate in one or both of its operating positions, thereby preventing movement of the gate until the locking means is released.

Another object is to provide relatively simple means in conjunction with a fabricated gate valve for locking the gate directly to the valve body, thus holding the gate in its locked position independently of the valve operator.

Additional objects and features of the invention will appear in the following description in which the preferred embodiment has been set forth in detail in conjunction with the accompanying drawing.

Briefly the present invention consists of a gate valve having a box-like valve body formed of rectangular flat end walls connected along their side edges by side walls. The end walls have aligned openings forming flow passages and the upper and lower ends of the body are closed by suitable closure means. A flat gate is disposed within the body and is movable, as by means of a conventional valve operator, in opposite directions between full open and closed valve positions. Means is provided for positively locking the gate to the body in at least one of its operating positions, the means consisting of at least one lock pin together with means for adjustably mounting the pin in a side wall of the body near one end thereof. When in locking position, the inner end of the pin extends into a notch or recess in the corresponding portion of the gate, thereby locking the gate directly to the body. The pin can be retracted to withdraw its inner end from the notch or recess, thereby permitting normal valve operation.

Description of the preferred embodiment

Figure 1:
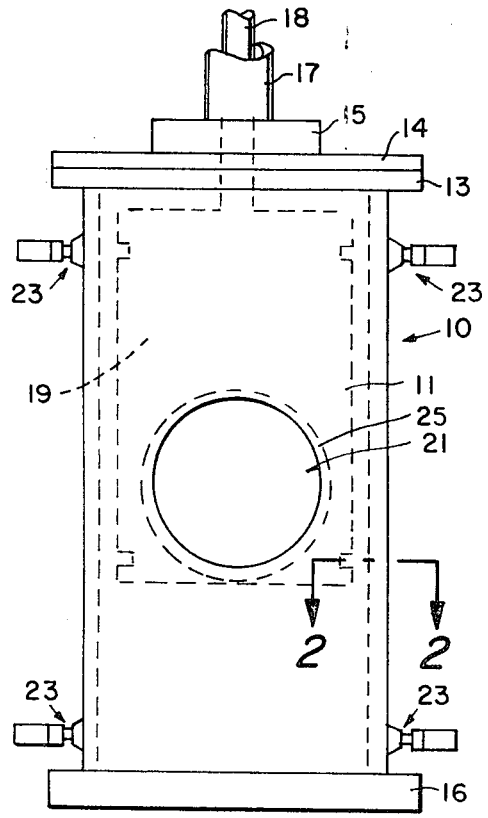
FIGURE 1 is an end view illustrating a gate valve incorporating the present invention.
Figure 2:
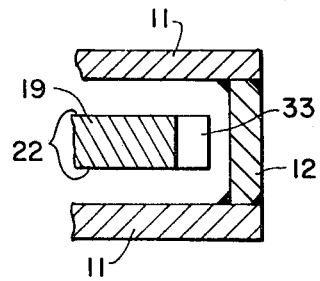
FIGURE 2 is a cross-sectional detail taken along the line 2—2 of FIGURE 1.

The gate valve illustrated in FIGURE 1 consists of a box-like fabricated body 10 formed of rectangular metal end walls 11 secured along their side edges to the metal side walls 12. The upper end of the body is provided with a welded-on metal flange 13 to which the bonnet plate 14 is bolted. A metal mounting plate 15, which is bolted or otherwise removably secured to the bonnet plate 14, may serve as the mounting for a suitable valve operator. The lower end or bottom of the body is shown provided with a welded-on metal closure plate 16. The tube or pipe 17 shown mounted upon the plate 16 may represent the yoke of an operator of the hand wheel type, or may represent the cylinder of a hydraulic piston-cylinder type of operator. The operating stem or rod 18 has its inner end connected to the corresponding end of the metal valve gate 19. The aligned openings 21 in the end walls 11 form flow passages communicating with cooperating piping.

The gate is flat, being provided with parallel valve working surfaces 22. As previously mentioned, such gate valves are provided with suitable means to provide annular seals 25 between the body and the valve working surfaces 22, and to provide proper shut-off when the gate is in closed position. By way of example, such sealing assemblies may be in accordance with Patent No. 3,269,695.

The particular type of gate valve illustrated is one of the through-port type, having its gate provided with an opening which registers with the body openings 21 for full open position of the valve. The gate is shown in full open position in FIGURE 1. When the valve is closed, the gate is moved downwardly until its lower end is in proximity with the bottom closure plate 16. However, the invention is applicable to other types of gate valves in which the gate is short and does not have a port which registers with the openings 21 for full open position. In such event, the body of the valve is shorter, whereby all or certain portions of the gate again are brought into proximity with the bottom plate 16 when the valve is closed.

Figure 3:
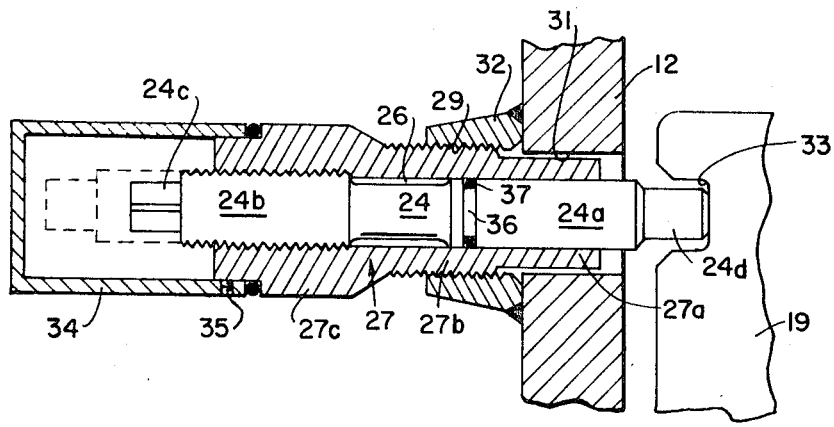
FIGURE 3 is a cross-sectional detail illustrating a suitable construction for one of the locking pins.

For the purpose of locking the gate 19 and thus preventing its normal operation, I have shown a plurality of locking devices 23 which are mounted in the side walls 12 of the body. These devices can be duplicates, and can be made as illustrated in FIGURE 3. Each device consists of a metal pin 24 having a portion 24a slidably fitted within a bore 26 formed in the fitting 27. The side wall 12 of the body is provided with an opening 31 to accommodate the annular portion 27a of the fitting, and a portion 27b of the member 27 is threaded into a spud 32 which is attached as by welding to the wall 12. The exterior portion 27c of the member 27 is threaded to engage the threaded portion 24b of the pin 24. The end 24c of the pin 24 can be square or otherwise formed whereby a tool can readily be applied to turn the pin for endwise adjustment between locking and retracted positions. The adjacent portion of the gate 19 is shown provided with a recess or notch 33 which is dimensioned to accommodate the adjacent end portion 24d of the pin 24. A cap 34 is shown attached to the portion 24b and is retained by suitable means such as the set screw 35. This cap can be readily removed for turning the pin.

Suitable sealing means is provided to prevent leakage between the pin and the spud 32. Thus the pin is shown provided with an annular recess or groove 36 to accommodate the seal ring 37 of the resilient O-ring type.

It will be evident that when the end portion 24d of the pin is engaged within the notch 33 of the gate, the gate is effectively locked against normal movement. However, the pin can be retracted from locking engagement by turning the pin, thus retracting the portion 24d completely out of the notch 33.

In practice, a single locking device of the type shown in FIGURE 3 can be installed on one corner of the valve body to lock the gate in one position. However, it is generally desirable to provide two such locking devices on opposite sides of the valve. For example, if it is desired to lock the gate in its full open posiiton as illustrated in FIGURE 1, then it is only necessary to provide two locking devices 23 located near the upper end of the body. These devices can be adapted to have the inner ends of their pins engage notches formed in the upper portion of the gate, as illustrated in FIGURE 1. In instances where it is desired to lock the gate in both full open and closed positions, an additional set of locking devices 23 can be located near the bottom of the body in the manner shown in FIGURE 1. It will be evident that the lower set of locking devices are adapted to engage notches in the lower corners of the gate, as likewise shown in FIGURE 1.

It will be evident from the foregoing that I have provided a gate valve with positive means for locking the gate in one operating position, thereby preventing normal operation. When the valve has been locked in this fashion, it is necessary to retract the locking pins before the gate is moved to its other operating position. Such locking devices can be used when the valve is being repaired under field conditions. In other words, the gate can be locked with respect to the body to prevent undesired or accidental movement, during and after removal of the bonnet plate 14 and with the valve operator from the upper end of the valve body.

I claim:
1. In a gate valve, a box-like valve body formed of flat rectangular end walls connected along their side edges to parallel side walls, the end walls having aligned openings therein forming flow passages, upper and lower closure means for the upper and lower ends of the body, a flat gate disposed within the body and normally movable in opposite directions within the body between full and open and closed valve positions to control flow through the passages, annular sealing means carried by the body and engaging the opposite faces of the gate in annular regions surrounding the flow passages, and means for locking the gate in at least one of said positions, said means comprising a lock pin and means for adjustably mounting the lock pin in one side wall of the body near one of said end closure means, the pin extending generally parallel to the gate, a corresponding portion of the gate faced toward the said one side wall having a notch to accommodate the inner end of the pin, the pin being adjustable to either a position in which its inner end is disposed within the recess to lock the gate aganst normal movement, or to a retracted position in which its inner end is retracted from the recess to unlock the gate and thereby permit its normal movement.

2. A valve as in claim 1 in which two of said pins are provided, the two pins being mounted in the two sides of the body near one of said end closure means.

3. A valve as in claim 1 in which four of said pins are provided, two of said pins being mounted in the side walls of the body near one of said end closure means, and the other two pins being mounted in the two sides of the body near the other one of said end closure means, said pins serving to lock the gate against normal movement in either its full open or closed position.

References Cited

UNITED STATES PATENTS 2,982,514  5/1961  Bryant _____ 251—329

FOREIGN PATENTS 609,728  9/1960  Italy.

ARNOLD ROSENTHAL, *Primary Examiner.*

U.S. Cl. X.R.

251—326